United States Patent
Hocker, III et al.

(10) Patent No.: US 6,826,664 B2
(45) Date of Patent: Nov. 30, 2004

(54) INTERLEAVING SYNCHRONOUS DATA AND ASYNCHRONOUS DATA IN A SINGLE DATA STORAGE FILE

(75) Inventors: Lon O. Hocker, III, Hilo, HI (US); Mark A. Hruska, Hilo, HI (US)

(73) Assignee: Onset Computer Corporation, Bourne, MA (US)

( * ) Notice: Subject to any disclaimer, the term of this patent is extended or adjusted under 35 U.S.C. 154(b) by 0 days.

(21) Appl. No.: 10/744,372

(22) Filed: Dec. 23, 2003

(65) Prior Publication Data

US 2004/0139291 A1 Jul. 15, 2004

Related U.S. Application Data

(60) Provisional application No. 60/439,218, filed on Jan. 10, 2003.

(51) Int. Cl.[7] ............................................. G06F 12/00
(52) U.S. Cl. ...................................... 711/157; 707/102
(58) Field of Search ........................ 711/157; 707/101, 707/102

(56) References Cited

U.S. PATENT DOCUMENTS

| | | | | |
|---|---|---|---|---|
| 5,564,285 A | * | 10/1996 | Jurewicz et al. ............... | 62/127 |
| 6,332,117 B1 | * | 12/2001 | Berry et al. ................. | 702/187 |
| 6,754,219 B1 | * | 6/2004 | Cain et al. .................. | 370/401 |
| 2003/0200022 A1 | * | 10/2003 | Streichsbier et al. ......... | 701/108 |
| 2003/0212789 A1 | * | 11/2003 | Hamel et al. ............... | 709/225 |

* cited by examiner

Primary Examiner—Hiep T. Nguyen
(74) Attorney, Agent, or Firm—Weingarten, Schurgin, Gagnebin & Lebovici LLP

(57) ABSTRACT

A method and apparatus for storing interleaved synchronous and asynchronous data in a single data storage file is disclosed. Synchronous data and asynchronous data are stored in an interleaved order. Synchronous data is stored at regular periodic intervals and is stored within the data storage file in a data record having a constant sized data field. At least one data pattern is precluded from use as synchronous data. Data associated with asynchronous events are stored in the data storage file in a data record starting with this precluded data pattern, and followed by a field indicating the asynchronous event type. The time interval from an event associated with the previously recorded data can be determined and optionally stored in a variable length time-interval data field. The size of the variable length time-interval data field is stored in a time-length data field.

16 Claims, 3 Drawing Sheets

INTERLEAVING SYNCHRONOUS DATA AND ASYNCHRONOUS DATA IN A SINGLE DATA STORAGE FILE

CROSS REFERENCE TO RELATED APPLICATIONS

This application claims priority to U.S. Provisional Patent Application 60/439,218, entitled "Interleaving Synchronous and Asynchronous Data in a Datafile," filed Jan. 10, 2003.

STATEMENT REGARDING FEDERALLY SPONSORED RESEARCH OR DEVELOPMENT

N/A

BACKGROUND OF THE INVENTION

This application is generally directed to data storage systems and in particular to data storage systems that store both synchronous and asynchronous data in the same data storage file.

Data logging devices are often used to store measurements collected by sensor devices at regular, periodic intervals, referred to herein as "synchronous data." For example, a temperature sensor may provide 8 bits of temperature data every 10 minutes. Reconstructing the temperature over a time period of several measurements is then a matter of determining the time the initial temperature data was taken, which may be stored by the data logging device in conjunction with the initial data, and then using the known periodic interval between each subsequent temperature measurement to reconstruct the temperature over the desired time period.

In some circumstances, it is important to store data associated with the occurrence of an event or a condition that does not necessarily occur at regular periodic intervals, referred to herein as "asynchronous data." For example, it may be desirable to store the time an external switch closure or opening occurs. In these circumstances, not only is the data associated with the event stored, but the time that the event occurred must be stored as well.

In some circumstances, it may be desirable to store both synchronous and asynchronous data in the same data file. Since the synchronous data may be of a type distinct from the type(s) of the asynchronous data, it is necessary to uniquely identify each recorded data type along with the absolute or relative time the data was recorded. In some circumstances, it may be desirable to store other data-characterizing information in association with one or more sets of data. Storing all of the data required to enable later use of co-mingled synchronous and asynchronous data has heretofore represented an inefficient use of data storage space.

What is needed therefore is a method for efficiently storing both synchronous and asynchronous data, along with all necessary characterizing information, in the same data storage file.

BRIEF SUMMARY OF THE INVENTION

A method and apparatus for efficiently storing interleaved synchronous and asynchronous data in a single data storage file is disclosed. Normally a header area is placed first in the data file. This header includes initial information such as the starting time, time zone, enabled sensors, sensor descriptions, location and the like. After the header, synchronous data is stored as it is received at regular, periodic intervals. A data analysis system, which presumes a data record is a synchronous data record absent characterization to the contrary, knows the time interval between successive instances of synchronous data storage and can determine the time that a particular synchronous data set was recorded relative to the starting time. The size of the synchronous data packet is usually constant, although it could be changed during recording process if the change is described by an asynchronous event.

Asynchronous data is stored in such a way to make it distinguishable from the synchronous data records in the data file. To accomplish this, a unique data pattern, such as one often used to indicate the end of valid data in a data_file, is defined. The device recording the data in the data file is not allowed to use the unique data pattern as a representation of synchronous data. It may thus be referred to as a precluded data value.

The asynchronous data record starts with this data pattern and also includes a type field for identifying the associated data type to a data analysis system. At the very least, the type field indicates to the data analysis system that the respective data was recorded asynchronously and that further data must be processed to determine the time at which the respective data was recorded. The type field may also be used for further characterizing the associated asynchronous event.

In one embodiment, the time delay from the last recorded data record (synchronous or asynchronous) is determined and also stored in a variable length characterizing field associated with the respective asynchronous data. The characterizing field includes data which identifies to the data analysis system the size of the time-delay data and the variable length time-delay data itself.

Other aspects, features, and advantages of the present invention are disclosed in the detailed description that follows.

BRIEF DESCRIPTION OF THE SEVERAL VIEWS OF THE DRAWINGS

The invention will be more fully understood with reference to the following detailed description and drawings, of which.

DETAILED DESCRIPTION OF THE INVENTION

Figure 1:
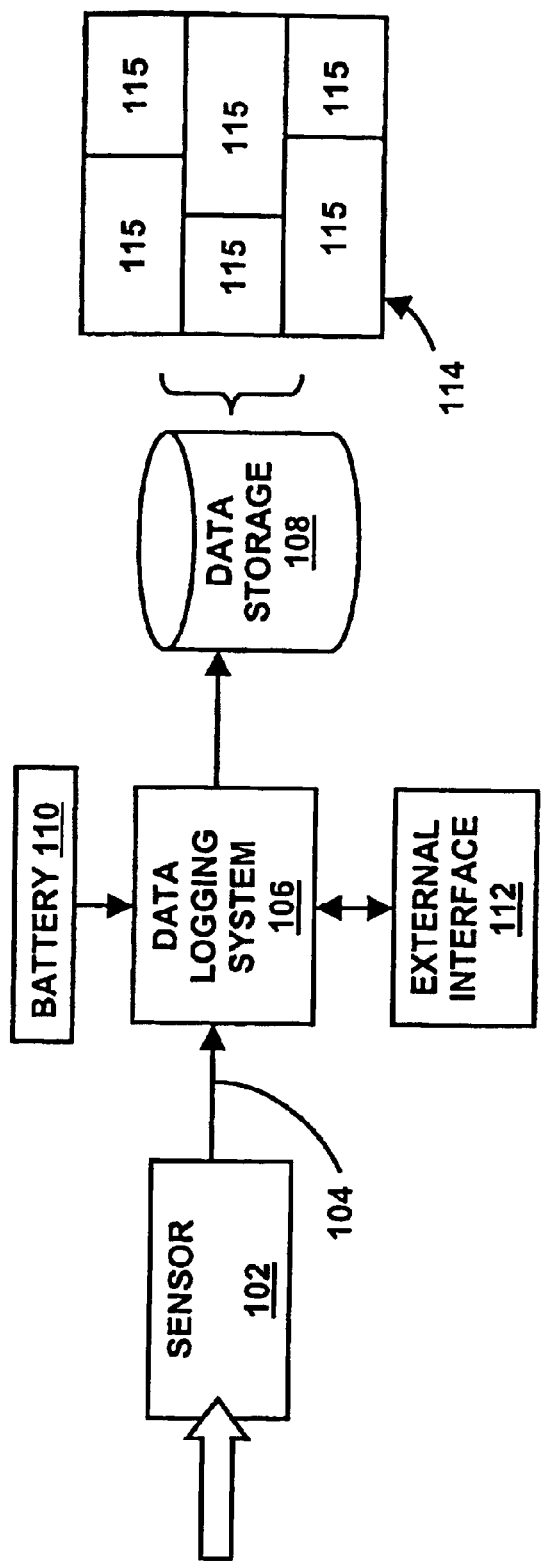
FIG. 1 is a functional block diagram of an apparatus suitable for storing interleaved synchronous and asynchronous data according to the presently disclosed invention.
Figure 2:
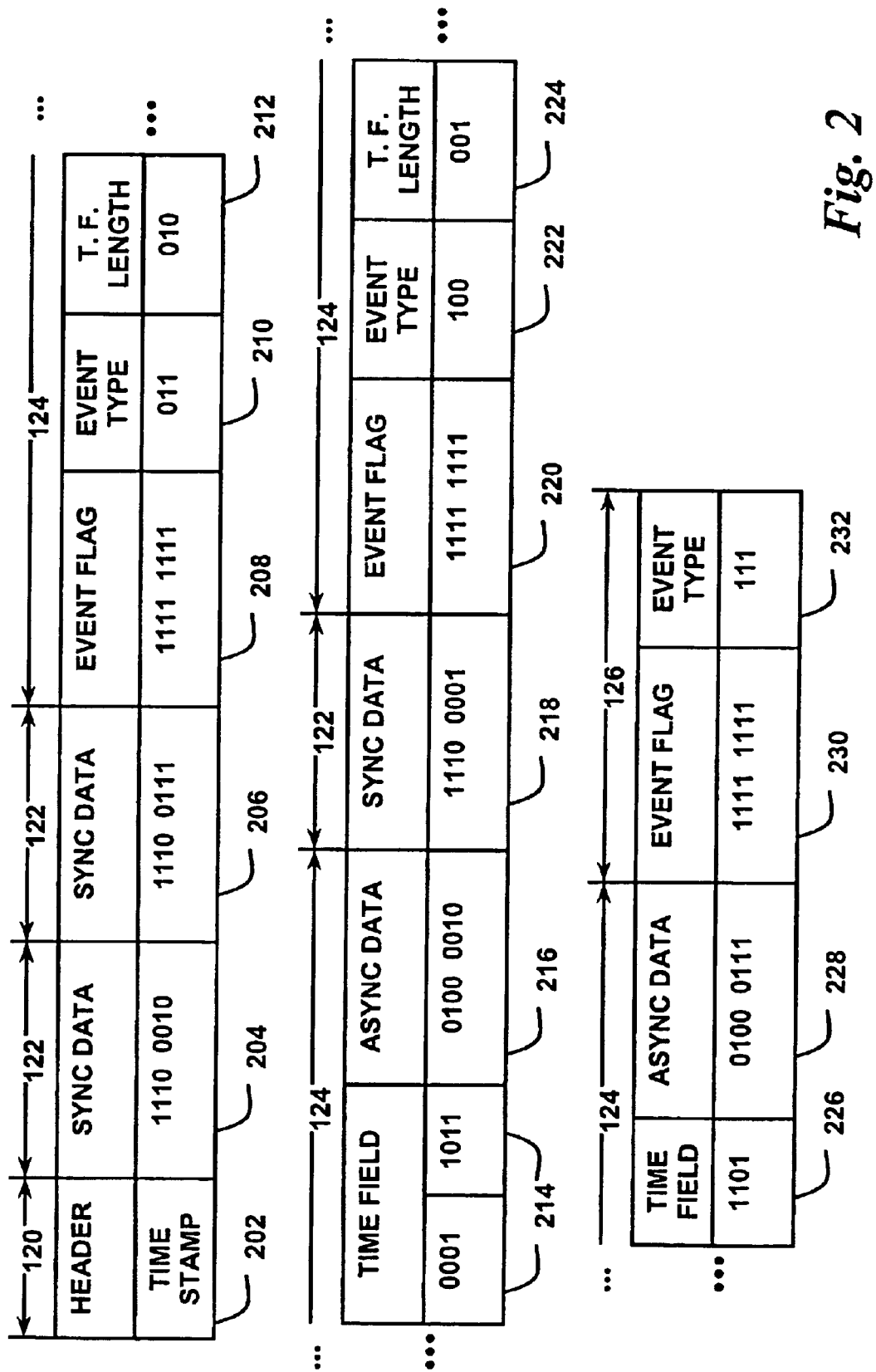
FIG. 2 is a representation of an exemplary instance of a data file generated according to the presently disclosed invention including interleaved synchronous and asynchronous data.
Figure 3:
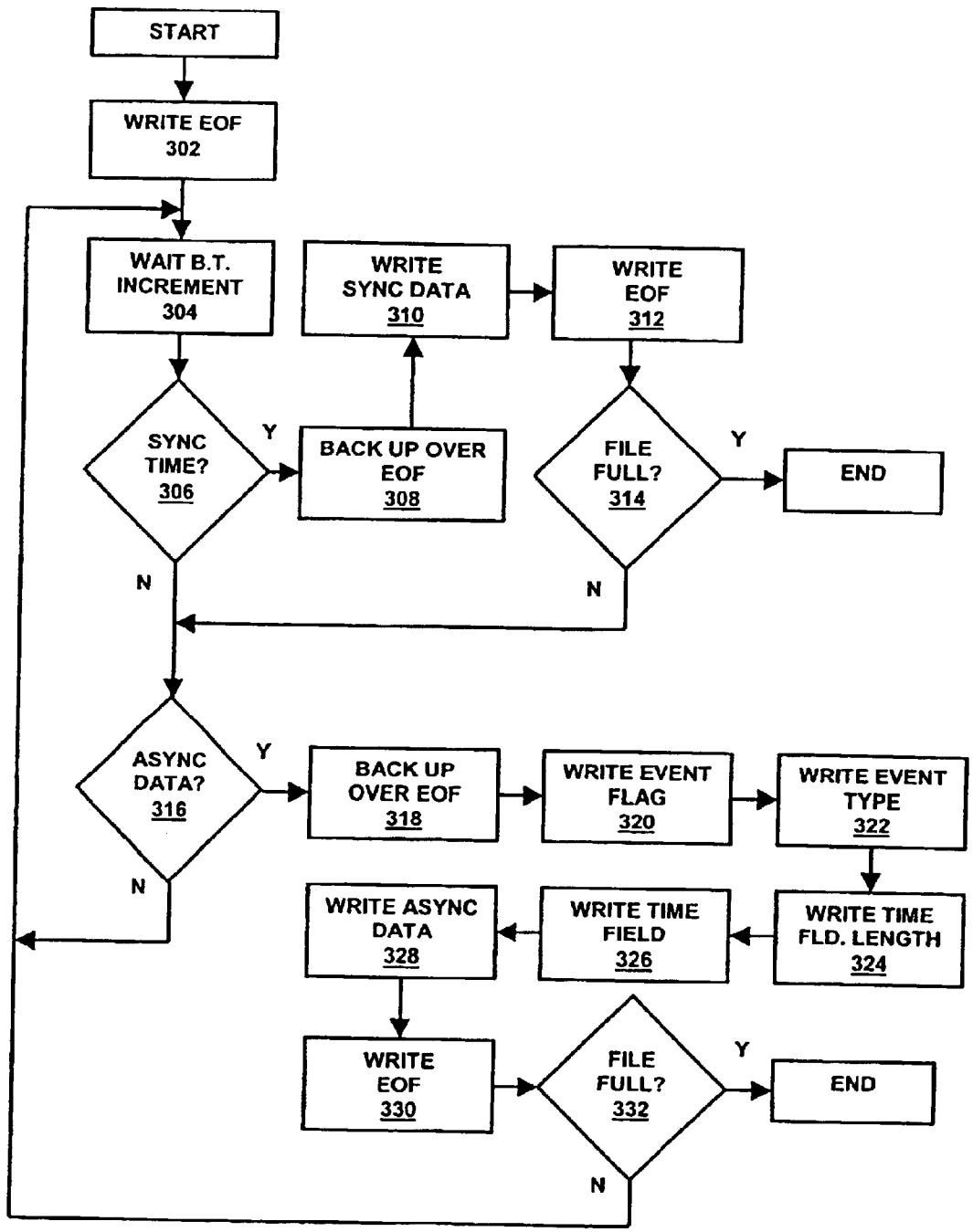
FIG. 3 is a flow chart of a method suitable for storing interleaved synchronous and asynchronous data according to the presently disclosed invention.

Referring to FIGS. 1, 2, and 3, an apparatus and method are disclosed for interleaving synchronous and asynchronous data within the same data storage file. The method of FIG. 3 is to be read in conjunction with the description of the apparatus that follows.

FIG. 1 functionally illustrates an apparatus which can be used to implement the presently disclosed method of data storage. The method and resulting data file find utility in a variety of settings, however, and are not in any way limited to use solely with the presently described system. The apparatus 100 includes one or more sensors 102 that senses a physical characteristic and provides measured sensor data 104 indicative of the measured physical characteristic to a data logging system 106. In general, the measured sensor data 104 is n-bits long, where n is selected as a function of the individual sensor 102, the data logging system 106, and the ultimate use of the measured sensor data 104. The data logging system 106 stores the received measured sensor data 104 in a storage device 108 so that the measured sensor data 104 can be accessed for further analysis or post-processing as needed. The data logging system 106 stores the received measured sensor data 104 within a data storage file 114 contained within the associated storage device 108. The data storage file 114 is comprised of a plurality of data records 115, wherein each data record 115 includes one or more data fields based upon the type of data to be stored by the data logging system 106.

With reference to FIG. 2, there are essentially two types of data records 115: a synchronous data record 122; and an asynchronous data record 124. Those data records 115 that represent asynchronous data have a variable length since they may contain different kinds of data and different amounts of data. Those data records 115 that represent synchronous data are of fixed length, that length being the sum of the n-bit lengths of the data from the individual sensors 102. It is important to note that if one value of the first sensor n-bit data stored in the record 115 is precluded, this is sufficient to provide a unique value that can be used to indicate an asynchronous event.

The data sensor 102, data logging system 106, and data storage device 108 of FIG. 1 are depicted as discrete elements, though in a preferred embodiment all may be implemented within a single physical enclosure, and may in fact be integrated into one or more active devices. Typically, these devices include one or more sensors, a microprocessor, at least one persistent memory, and a power source such as a battery. An external interface is provided for uploading data from the memory to remote analysis equipment, for time syncing a microprocessor clock, and, optionally, for downloading programming instructions for the microprocessor into the persistent memory.

In the case where synchronous and asynchronous data are interleaved in a common memory space, the microprocessor must be capable of recording data measurements at predefined time intervals. A timer providing a periodic interrupt to the microprocessor may enable this function. The microprocessor must also have the ability to respond to certain stimuli or to perform continuous data testing to identify the occurrence of predetermined conditions, either of which require the recording of asynchronous data in the memory. For instance, the sensor may include a tipping bucket rain gauge, whereby each tip of the bucket results in an interrupt at the microprocessor which then enters appropriate data in the memory. In another case, the sensor may continuously (or at regularly spaced time intervals) monitor a value such as its own battery level. If the microprocessor determines that the level has dropped below a predetermined threshold, relevant data is written into the memory file by the microprocessor. How the asynchronously written data is uniquely identified and characterized is discussed in detail below.

In general, synchronous data is sensed and stored at a constant frequency, i.e., the data sensor senses a particular physical characteristic and provides this sensed data to the data logging system at a constant rate. Reconstructing the sensed data as a function of time is simplified because each data sample occurred a set time period after the previous data sample. Knowing the initial time, reconstructing the sensed physical characteristic over time is easy since the time-delay between the initial time and the data sample of interest is merely the product of the number of intervening synchronous data samples and the sample period. Adding the time-delay to the initial time allows an accurate time value to be derived for each synchronous data sample. Accordingly, there is no need to store any additional time data corresponding to a particular synchronous data sample.

To identify the last valid measurement recorded in the data storage device 108 from among a series of data measurements, a predetermined end-of-file bit pattern is employed. In the case where only synchronous data is recorded, the only information stored in the data file that is not synchronous data, aside from a header, is an end-of-file indication. The predetermined end-of-file bit pattern need only be a single reserved value equal in length to the n-bit data pattern associated with first sensor data. A typical end-of-file bit pattern is all logical ones. Care must be taken to make sure that this bit pattern cannot be stored as a normal bit pattern for that data field.

To reiterate, asynchronous data is sensed data that corresponds to one or more predetermined recordable events. Accordingly, the reconstruction of asynchronous data is not as straightforward as synchronous data and some sort of time data must be provided with each asynchronous data record. When synchronous and asynchronous data are to be interleaved into the same data storage file, the provision of time data in asynchronous data records must be efficiently reconciled with the format for recording synchronous data.

With both synchronous and asynchronous data in the data file, the unique bit pattern identifies information which is not synchronous data. An asynchronous data field in the data file starts with the aforementioned unique bit pattern and is immediately followed by a fixed length event type field, one value of which is defined as an end-of-file indication. The other values of the event type field are used to uniquely identify the specific type of asynchronous data. After the event type, the time of the event is recorded, if appropriate for that specific event. This time data is preferably with respect to the last-recorded data record (synchronous or asynchronous). A simple embodiment of the presently disclosed system and method employs a relative time data field of predetermined length. However, the length of time T which may pass between a last-recorded event and a subsequent asynchronous event can be very short or very long, depending upon the circumstances. For maximum efficiency, it is preferred that the relative time data field comprise a first sub-field for defining the number N of data blocks necessary to represent the relative time delay and a second sub-field to identify the time delay itself.

An exemplary instance of a data file 114 is shown in FIG. 2. Data beyond the header 120, 202 begins with a first synchronous data record 204. For purposes of illustration, the synchronous data record is eight bits long, though a greater or lesser number can be employed as dictated by the circumstances. As previously stated, each synchronous data record may comprise plural fields, though only one is illustrated per record in FIG. 2 for simplicity. A second synchronous data record 206 is shown immediately following the first 204. Note that each synchronous data record is of the same length.

Next comes an event flag 208 which is the same length as the synchronous data record, since the shown synchronous records contain only a single 8-bit field. To distinguish this record as containing data other than synchronous data, it starts with an event flag assigned the predetermined data value, typically all ones, that is precluded as a valid synchronous value.

A subsequent data field 210 of predetermined length is used to identify the type E of the event ("EVENT TYPE"). As noted above, one event is the data file terminator, typically represented by all ones. Other values of the event type field 210 can be used to indicate other events. For example, referring to the exemplary embodiments described above, one predefined special event type value may represent a tipping bucket rain gauge interrupt, while another value may identify a battery level reading falling below a predetermined level.

In order to show the elapsed time since the recording of the data record which preceded this asynchronous record, which in the case of FIG. 2 is a synchronous data record 206, time field length data 212 ("T. F. LENGTH") and the time field 214 itself are provided. To reiterate, the time field length data 212 reflect the number N of data blocks required to represent the length of time T which has elapsed since the preceding data record (synchronous or asynchronous) was recorded. The number of bits provided for the time field length data 212 is a predetermined value. In the illustration, the time field length data 214 indicates the length of the time field in nibbles. Since the data field holds the number two, two subsequent nibbles are to be regarded as the time field 216. The time field itself represents the time delay T between data records, the units of which (e.g., a millisecond, 1/10 second, one second, etc.) are predefined, and are considered to be the basic time unit of the device. It is recognized that for some events this time information is not needed, and can be omitted to reduce storage needs.

In a further embodiment, the time field length data 212 and the time field 214 can be used to indicate the elapsed time relative to the starting time found in the header 120 or to indicate absolute time. In most cases, however, recording time relative to the previous record will be the most efficient in terms of memory usage. The absolute time of an event is determined during a subsequent analysis process by adding the intervening delays and determining the total offset from the start.

After the event flag 208, event type 210, time field length 212 and time field 214 comes the actual data associated with the event 216. The amount of space used by this data is predetermined by the event type, or may be variable if the length is stored within this data packet in a predetermined way. For some events this length can be zero.

Again with respect to FIG. 2, another synchronous data record 218 is shown as having been recorded next. After that, another asynchronous data block is illustrated, composed of an event flag 220, an event type 222, time field length data 224, a time field 226, and finally the data itself 228.

Each time the data logging system 106 (or any other system implementing the presently disclosed method) records another data record into the data file 114, it follows that data record with an event flag 230 and an event type field 232 indicating end-of-file. If the data logging system 106 were to write a subsequent data record (synchronous or asynchronous), it would do so by overwriting the event flag 230 and event type field 232, and would append a new event flag 230 and event field 232 indicating end-of-file.

In the instance where synchronous data is presented for recording simultaneously with asynchronous data, a preferred approach is to record the synchronous data first, followed by the asynchronous data. The time field for the asynchronous data, representing the temporal offset from a previous data record, can be set to zero in this case.

A method of interleaving synchronous and asynchronous data, suitable for use with the apparatus depicted in FIG. 1 and the data records depicted in FIG. 2, is depicted in FIG. 3. A header area 120 including initial information such as starting time, time zone, enabled sensors, sensor descriptions, locations, etc. has already been recorded. The data logging system 106 stores 302 an end-of-file (EOF) indication as the first data record in the data storage file 114 prior to receiving sensor measured data 104 from the sensor 102. The system then waits the basic time (B. T.) unit 304 and checks to see if there is new data to record.

If the interval for recording synchronous measurements has expired 306, the microprocessor backs the file pointer over the end-of-file marker 308 and writes the synchronous data 310 and a new end-of-file marker. If this fills the data storage area, the logging application has ended. If the interval has not expired, the microprocessor proceeds to check to see if there is asynchronous data to store.

If the microprocessor makes the determination 316 that there is asynchronous data to store, it first backs up over the end-of-file marker 318 and then writes an event flag 208, 320 and an event type field 210, 322 indicative of the type E of the asynchronous data.

The microprocessor next establishes how many basic time units have elapsed relative to, for instance, the most recent data recording. The number N of data blocks 212 of predefined length needed to represent this number of basic time units is calculated and is written 324 into the data file, followed by 326 a representation of the number of basic time units 214 itself. Note that in FIG. 2, the first time field length 212 has a value of binary two, so the subsequent time field 214 is comprised of two data blocks. The four-bit field length of the time field data blocks is chosen merely as an example; any number could be employed.

Depending upon the specific asynchronous event, it may be necessary to write 328 data corresponding to the event 216 subsequent to the elapsed time data 214 and prior to a subsequent end-of-file designator to further characterize the respective asynchronous data.

The microprocessor then writes 330 a new end-of-file indicator 230, 232 and checks to see if the data file is full 332. If it is, it stops recording, otherwise it waits another time increment 304.

Those of ordinary skill in the art should further appreciate that variations to and modification of the above-described methods and apparatus for interleaving synchronous and asynchronous data in a single data storage file may be made without departing from the inventive concepts disclosed herein.

Accordingly, the invention should be viewed as limited solely by the scope and spirit of the appended claims.

What is claimed is:

1. A method of storing data characteristic of synchronous events and asynchronous events in a data file, the method comprising:

sequentially storing data values each associated with a respective one of a sequence of synchronous events; and interjecting data values each associated with a respective asynchronous event within said sequentially stored synchronous event data, wherein each asynchronous data value comprises a first portion having data indicative of a unique event and a second portion having data indicative of an asynchronous event type, and wherein the sequentially stored synchronous event data values are precluded from assuming the value of the data indicative of a unique event.

2. The method of claim 1, wherein each asynchronous data value further comprises data characterizing a relative time of occurrence of the respective asynchronous event.

3. The method of claim 2, wherein the data characterizing a relative time of occurrence comprises a value indicative of the time elapsed between the event characterized by a previously stored data value and the respective asynchronous event.

4. The method of claim 2, wherein the data characterizing a relative time of occurrence comprises a value indicative of the time elapsed between an initial time value stored in the data file and the respective asynchronous event.

5. The method of claim 2, wherein the data characterizing a relative time of occurrence comprises:

a first data value identifying a number of subsequent data blocks of predetermined length employed for representing a time value; and the data blocks of predetermined length representing a time value.

6. The method of claim 1, wherein the asynchronous data value further comprises one or more additional data fields following the data indicative of an asynchronous event type.

7. The method of claim 1, further comprising the step of writing an end-of-file indicator subsequent to a last-written data value.

8. The method of claim 7, wherein the step of writing an end-of-file indicator comprises writing the data indicative of a unique event followed by an event type indicative of end-of-file.

9. The method of claim 7, wherein the steps of sequentially storing and interjecting data values comprise overwriting a previously written end-of-file indicator.

10. A system for storing synchronous and asynchronous data received from at least one sensor, the system comprising:

a data logging device for receiving sensor data from the at least one sensor;

a memory associated with the data logging device for storing at least one data file; and an interval timer for determining the time interval between the occurrence of an event associated with an instance of stored sensor data and an event associated with sensor data received by the data logging device for recording in the at least one data file, wherein the data logging device is operative to receive and store synchronous data from the at least one sensor at regular temporal intervals and to receive and store asynchronous data from the at least one sensor at irregular temporal intervals, wherein the asynchronous data comprises an event identifier field, indicative that the respective data is not synchronous data, and an event type field, indicative of the type of event associated with the respective asynchronous data, and wherein the data logging device is operative to receive and interleave synchronous and asynchronous data in a sequential fashion within the at least one data file.

11. The system of claim 10, wherein the asynchronous data further comprises data indicative of the time interval, determined by the interval timer, between the event associated with the last data, synchronous or asynchronous, stored in the data file and the event associated with asynchronous data received from the at least one sensor.

12. The system of claim 11, wherein the time interval data comprises a first part indicative of a number of data blocks necessary to store the time interval data and a second part being the time interval data.

13. The system of claim 10, wherein the asynchronous data further comprises one or more additional data fields for further characterizing the respective asynchronous event.

14. The system of claim 10, wherein the data logging device is further operative to write an end-of-file indicator subsequent to a last-stored synchronous or asynchronous data value.

15. The system of claim 14, wherein the end-of-file indicator comprises an event identifier field, indicative that the respective data is not synchronous data, and an event type field, indicative of end-of-file.

16. The system of claim 14, wherein the data logging device is further operative to overwrite a previously written end-of-file indicator when storing new synchronous or asynchronous data.

* * * * *